United States Patent Office 2,861,000
Patented Nov. 18, 1958

2,861,000

OPTICAL GLASS

Walter Geffcken and Gerd Rehs, Landshut, Germany, assignors to Jenaer Glaswerk Schott & Gen. Mainz, Rhineland-Pfalz, Germany No Drawing. Application May 4, 1953
Serial No. 352,992

Claims priority, application Germany May 9, 1952

12 Claims. (Cl. 106—47)

It is known that optical glasses of a refractive index ranging from 1.65 to 1.74 can be produced which contain, aside from boron oxide and earth alkali oxides, considerable percentages of rare earths and possess what, in view of their high refractive index, must be regarded as very high values of the Abbe number $v$. If they are to show extra high values of $v$, however, the technically usable glasses of this kind which have so far become known, have a content of thorium oxide, which is undesirable in glasses because of its radioactivity, or of beryllium oxide, which exercises dangerous poisonous effects.

As has been found, however, there are also, in systems composed only of boron oxide ($B_2O_3$), lanthanum oxide ($La_2O_3$), calcium oxide (CaO), and in some cases zirconium oxide ($ZrO_2$), certain fields for glasses of the optical character above indicated tending so little toward crystallization that they can be completely homogenized without difficulty by stirring at low temperatures, so that the glass obtained answers the highest optical requirements. The present invention refers to those of the glasses of this composition which have a refractive index $n_d$ of at least 1.68, and in accordance with the invention contain from 36% to 50% boron oxide, at the most 11% zirconium oxide, 26% to 44% lanthanum oxide, and 5% to 19% of calcium oxide, the latter, however, with the restriction that the calcium oxide content must not be higher than 33% minus one half the content of lanthanum oxide.

In particular, the following relations may be stated which give, for a desired value of $n_d$, narrower limits for the components of the glasses of the invention: The content of boron oxide must be chosen such that it lies between $(45-190\ (n_d-1.69))\%$ and $(48-190\ (n_d-1.69))\%$, and the content of zirconium oxide for $n_d$ equal to or under 1.69 between 0% and 11%, and for $n_d$ larger than 1.69 between $220\ (n_d-1.69)\%$ and the above stated maximum value of 11%. It should be pointed out that because of the relations just stated, the boron oxide content is higher than that of all known crown glasses of the same refractive index.

With a content of lanthanum oxide of between $(28+220\ (n_d-1.69))\%$ and $(44-60\ (n_d-1.69))\%$, glasses can be obtained in which, for a given value of $n_d$, the value of $v$ is extra high. The upper limit of lanthanum oxide here means that while still higher contents will yield stable glasses, such glasses are not to be recommended for mass production. The lower limit for lanthanum oxide, of $(28+220\ (n_d-1.69))\%$, and a lower limit for calcium oxide of 5%, on the other hand, means that with still lower contents of these oxides, $v$ is not particularly high, in view of $n_d$. In order to obtain a clearer picture, the table below shows how, with these limits of the lanthanum oxide content, the limits of the various components look for refractive-index figures $n_d = 1.69$ to $n_d = 1.73$:

| $n_d$ | 1.69 | 1.70 | 1.71 | 1.72 | 1.73 |
|---|---|---|---|---|---|
| $B_2O_3$ | 45.0–48.0 | 43.1–46.1 | 41.2–44.2 | 39.3–42.3 | 37.4–40.4 |
| $ZrO_2$ | 0–11.0 | 2.2–11.0 | 4.4–11.0 | 6.6–11.0 | 8.8–11.0 |
| $La_2O_3$ | 28.0–44.0 | 30.2–43.4 | 32.4–42.8 | 34.6–42.2 | 36.8–41.6 |
| CaO | 5.0–19.0 | 5.0–17.9 | 5.0–16.8 | 5.0–15.7 | 5.0–14.6 |
| $La_2O_3+CaO$ | 41.0–55.0 | 42.9–54.7 | 44.8–54.4 | 46.7–54.1 | 48.6–53.8 |

The total of the four components $B_2O_3$, $ZrO_2$, $La_2O_3$ and CaO, as given in the table, should amount to 100 weight percent, and, additionally, the amounts of $La_2O_3$ and CaO should be chosen at values within the ranges given, so that their total quantity falls within the range given in the last line of the table. The CaO and $La_2O_3$ contents must also be so chosen that the calcium oxide content does not exceed 33 weight percent minus one-half the lanthanum oxide content.

In the glasses according to the invention under discussion, it is a notable circumstance that if the calcium oxide ranges between 8% and 15%, it is nearly equivalent optically to lanthanum oxide. If, accordingly, in a glass containing 10% of calcium oxide and 40% of lanthanum oxide, a portion of the weight of calcium oxide is replaced by the same weight of lanthanum oxide, then both $n_d$ and $v$ grow smaller, a behavior which controverts all hitherto established experience. A consequence of this behavior is that even with remarkably low lanthanum oxide contents, optical characteristics are obtained in which, considering $n_d$, $v$ reaches very high values.

The highest value of $v$ with any given $n_d$ is obtained when the content of zirconium oxide is held near its lower limit. In this case, the most favorable content of calcium oxide occurs at about 11%. Since the glasses of the invention consist only of $B_2O_3$, $La_2O_3$, CaO, and sometimes also $ZrO_2$, there follows, with the symbols in parentheses designating the percentual figures of the glass components:

$$(B_2O_3)+(ZrO_2)+(La_2O_3)+(CaO)=100$$

The above statement that the content of boron oxide lies between $(45-190\ (n_d-1.69))\%$ and $(48-190\ (n_d-1.69))\%$ may be written $$(B_2O_3)=(46.5-190\ (n_d-1.69))\pm1.5$$

By adding the above relation $$(ZrO_2)=220\ (n_d-1.69)$$

then, with $(CaO)=11$:

$$(La_2O_3)=100-(46.5-190\ (n_d-1.69))\pm1.5-220\ (n_d-1.69)-11$$

and therefore:

$$(La_2O_3)=42.5-30\ (n_d-1.69)\pm1.5$$

For the $n_d$ range between 1.69 and 1.73, this means that in the most favorable region, where, in round figures, (CaO) equals 11, ($La_2O_3$) lies between $42.5\pm1.5$ and $41.3\pm1.5$, or, therefore, is to be taken in round figures as being 42%. Since moreover:

$$(B_2O_3)+(ZrO_2)=46.5-190\ (n_d-1.69)\pm1.5+220\ (n_d-1.69)$$

it follows that, for the range of $n_d$ between 1.69 and 1.73, the value of $(B_2O_3)+(ZrO_2)$ lies between $46.5\pm1.5$ and $47.7\pm1.5$, and therefore can be assumed as a constant round value $$(B_2O_3)+(ZrO_2)=47$$

The proportions of these two components vary linearly with the refractive index in such manner that with $n_d=1.69$, the $ZrO_2$ content is zero and increases by 2% with each increase of $n_d$ by 0.01, while the content of $B_2O_3$ declines correspondingly.

If the zirconium oxide content is increased at the expense of the lanthanum oxide content, the refractive index remains practically unaltered, but the value of $v$ grows somewhat smaller, though not so much as to imply that the glasses could not be claimed as very favorable respecting their optical character in the sense above indicated. These glasses have a decreased tendency toward crystallization and require cheaper raw materials, so that they are very well suited for mass production in large batches. A further reduction of the cost of these glasses can be attained by replacing a further portion of the lanthanum oxide by calcium oxide up to the upper limit above stated, which fixes the content of calcium oxide as at the most 33%, minus half the content of lanthanum oxide.

It was further found that that share of the content of calcium oxide which is larger than 5% can be replaced wholly or in part by other bivalent glass components of basic character, like strontium oxide (SrO), magnesium oxide (MgO), barium oxide (BaO), zinc oxide (ZnO), and cadmium oxide (CdO) on condition that these substitutes do not exceed a combined total of 6%, while the sum of the bivalent components must not be over a value of 33%, minus half the percentual content of lanthanum oxide. Exchanging a given gravimetric quantity of CaO against the same amount of another substance within the limits stated, leaves the optical nature practically unaltered. An excess of CaO over 5% may also be replaced by lithium oxide in quantities of up to 2% of $Li_2O$, on condition that the sum of the percentages of the bivalent components, plus double the amount of the percentual content of lithium oxide, must not exceed the value of 33% minus half the percentual content of lanthanum oxide.

In addition, up to 9% of tantalum oxide ($Ta_2O_5$) or niobium oxide ($Nb_2O_5$), or of both combined, can be introduced into the glasses of the invention without thereby increasing the tendency of crystallization and while obtaining very high values of $n_d$.

Additional minor admixtures used in the manufacture of glasses, such as aluminum oxide ($Al_2O_3$), silicium oxide ($SiO_2$), indium oxide ($In_2O_3$), germanium oxide ($GeO_2$), tungsten oxide ($WO_3$) etc. can be introduced into the glasses of the invention up to a combined amount of 4%.

By staying within the following limits (of percentual weights), glasses may be produced which are especially favorable in regard to their melting properties:

| $B_2O_3$ | $ZrO_2$ | $La_2O_3$ | bivalent bases |
|---|---|---|---|
| 45–47 | 5–7 | 28–32 | 15–19 |
| 40–44 | 7–10 | 32–40 | 8–15 |
| 38–40 | 9–11 | 34–42 | 8–15 |

The same applies if the lanthanum oxide content is proportioned at from 42% to 44%, and the conent of the sum of the bivalent bases from 7% to 11%.

The above percentages hold good throughout the synthesis of the glasses of the invention with melts of from 1 to 10 kg, while in analysis, the content of boron oxide would average about 1% less.

In the following table, a number of examples of the glasses of the invention are listed according to their composition and optical character. The percentage figures again refer to synthesis.

| | $B_2O_3$ | $ZrO_2$ | $La_2O_3$ | CaO | | $n_d$ | $v$ |
|---|---|---|---|---|---|---|---|
| 1 | 47.5 | 1.9 | 43.4 | 7.2 | | 1.689 | 56.0 |
| 2 | 47.0 | ----- | 42.0 | 11.0 | | 1.690 | 56.3 |
| 3 | 47.0 | 6.0 | 30.0 | 17.0 | | 1.688 | 55.3 |
| 4 | 47.0 | 6.0 | 28.0 | 19.0 | | 1.688 | 55.0 |
| 5 | 45.0 | 6.0 | 38.0 | 11.0 | | 1.701 | 54.6 |
| 6 | 45.0 | 6.0 | 36.0 | 13.0 | | 1.700 | 54.9 |
| 7 | 45.0 | 6.0 | 34.0 | 15.0 | | 1.698 | 54.5 |
| 8 | 45.0 | 6.0 | 32.0 | 17.0 | | 1.698 | 54.1 |
| 9 | 44.0 | 10.0 | 38.0 | 8.0 | | 1.710 | 52.9 |
| 10 | 44.0 | 10.0 | 32.0 | 14.0 | | 1.705 | 53.4 |
| 11 | 42.0 | 6.0 | 42.0 | 10.0 | | 1.716 | 53.6 |
| 12 | 40.0 | 11.0 | 40.0 | 9.0 | | 1.732 | 51.2 |
| 13 | 38.0 | 10.0 | 40.0 | 12.0 | | 1.735 | 51.2 |
| 14 | 43.0 | 6.0 | 41.0 | 8.0 | 2.0 MgO | 1.708 | 54.1 |
| 15 | 43.0 | 6.0 | 41.0 | 8.0 | 2.0 BaO | 1.709 | 54.1 |
| 16 | 43.0 | 6.0 | 41.0 | 8.0 | 2.0 SrO | 1.709 | 53.7 |
| 17 | 43.0 | 6.0 | 41.0 | 8.0 | 2.0 CdO | 1.712 | 53.7 |
| 18 | 43.0 | 6.0 | 41.0 | 8.0 | 2.0 ZnO | 1.710 | 53.8 |
| 19 | 43.0 | 6.0 | 41.0 | 8.0 | 2.0 $Ta_2O_5$ | 1.713 | 53.5 |

We claim:

1. A thorium oxide and beryllium oxide free optical glass with a high refractive index consisting of (a) 36–50 weight percent boron oxide; (b) 26–44 weight percent lanthanum oxide; (c) 5–19 weight percent calcium oxide; (d) 0–11 weight percent zirconium oxide; (e) 0–6 weight percent of a bivalent basic component other than calcium oxide; (f) 0–9 weight percent of a member selected from the group consisting of niobium oxide, tantalum oxide, and mixtures thereof; (g) 0–2 weight percent lithium oxide; (h) 0–4 weight percent of compatible glass constituents; the amounts of (c), (e), and (g) not exceeding a total of 19 weight percent, the sum of (c), (e), and 2(g) not exceeding the value of 33 weight percent minus one-half (b).

2. Optical glass according to claim 1, in which (e) is a member selected from the group consisting of strontium oxide, magnesium oxide, barium oxide, cadmium oxide, and mixtures thereof.

3. Optical glass according to claim 1, in which (h) is a member selected from the group consisting of aluminum oxide, silicium oxide, indium oxide, germanium oxide, and tungsten oxide.

4. Optical glass according to claim 1, having a refractive index $n_d$ between 1.68 and 1.69, in which said boron oxide is present in amounts of between (45–190 ($n_d$—1.69)) weight percent, and (48–190 ($n_d$—1.69)) weight percent.

5. Optical glass according to claim 1, having a refractive index $n_d$ above 1.69, in which said boron oxide is present in amount between (45–190 ($n_d$—1.69)) weight percent and (48–190 ($n_d$—1.69)) weight percent, and in which zirconium oxide is present in amount between 220 ($n_d$—1.69) weight percent and 11 weight percent.

6. Optical glass according to claim 1, in which said lanthanum oxide is present in amount between (28+220 ($n_d$—1.69)) weight percent and (44–60 ($n_d$—1.69)) weight percent, $n_d$ equalling the refractive index of the glass.

7. Optical glass according to claim 1, in which said lanthanum oxide is present in amount of about 42 weight percent and said calcium oxide is present in amount of about 11 weight percent.

8. Optical glass according to claim 1, in which (a) is present in amount of about 45–47 weight percent, (d) in amount of about 5–7 weight percent, and a total of (c) and (e) present in amount of about 5–19 weight percent.

9. Optical glass according to claim 1, in which (a) is present in amount of about 40–44 weight percent, (d) in amount of about 7–10 weight percent, (b) in amount of about 32–40 weight percent, and the total of (c) and (e) in amount of about 8–15 percent.

10. Optical glass according to claim 1, in which (a) is present in amount of about 38–40 weight percent, (d) in amount of about 9–11 weight percent, (b) in amount of about 34–42 weight percent, and the total of (c) and (e) in amount of about 8–15 weight percent.

11. Optical glass according to claim 1, in which (b) is present in amount of about 42–44 weight percent and the total of (c) and (e) in amount of about 7–11 weight percent.

12. Optical glass consisting essentially of, by weight:

| | Percent |
|---|---|
| $B_2O_3$ | 36–50 |
| $ZrO_2$ | 4–11 |
| $La_2O_3$ | 35–44 |
| CaO | 5–10 |

References Cited in the file of this patent
UNITED STATES PATENTS

| | | |
|---|---|---|
| 2,241,249 | Eberlin et al. | May 6, 1941 |
| 2,466,392 | De Paolis | Apr. 5, 1949 |
| 2,466,510 | Sun et al. | Apr. 5, 1949 |
| 2,584,975 | Armistead | Feb. 12, 1952 |